Patented Dec. 17, 1929

1,739,652

UNITED STATES PATENT OFFICE

SAMUEL S. SADTLER, OF CHESTNUT HILL, SPRINGFIELD TOWNSHIP, MONTGOMERY COUNTY, PENNSYLVANIA, ASSIGNOR TO AMIESITE ASPHALT COMPANY OF AMERICA, OF PHILADELPHIA, PENNSYLVANIA, A CORPORATION OF NEW JERSEY

LIQUEFIER FOR PREPARING STONE FOR BITUMEN COATING

No Drawing.   Application filed August 18, 1927.   Serial No. 213,970.

This invention relates to bituminous road surfacing materials or compounds, and to the manufacture thereof, the separate materials being mixed substantially cold, as only the bituminous cement is heated. This material is then designed to be laid cold. The general class of road making material is the same as that of Patent #1,611,444. I will not go into a complete description of the methods followed in making this class of material, nor the uses to which it is to be put, but confine myself to showing the differences as compared with the prior art.

Hepburn, in #1,611,444, makes use of a slowly volatile liquefier, such as kerosene, I have found desirable results may be obtained by the use of material that has distinctly less volatility, but effects a certain drying or change due to oxidation, similar to seed oils (such as linseed) used in painting. The material I use, however, is purely a petroleum product, and is a by-product in the refining of kerosene and certain other oils, for example, unrefined lubricating oils by the use of sulphuric acid. Sulphuric acid is largely removed by steaming in the preparation of this by-product, although some acid may be still present when obtained from an oil refinery. A small amount of acid will not be harmful, however, as it will be neutralized by the excess of hydrated lime used. This material is, I believe, generally known as acid refinery sludge oil, but as I have described its occurrence, I believe I have sufficiently identified it.

In making stone-asphalt preparations for road use, the aggregate is first weighed out cold from a hopper into the pug mill or mixer, and while in agitation there is added to it sufficient of this oil to coat the surfaces, and then the melted asphalt is run on at a temperature above the boiling point of water, and below the temperature at which the asphalt would be injured from heating. I prefer to use this asphalt at the hopper at a temperature of about 250 to 260° F., and to use an oil asphalt of a penetration of about 85 to 100 for most purposes in temperate climates. But lower and higher penetrations of asphalt could be used without departing from the spirit of this invention, particularly in warmer or colder climates than in the neighborhood of Philadelphia.

Soon after the addition of the asphalt, I add about 10 pounds of hydrated lime. It frequently happens that there is not a thorough spreading of the asphalt until the lime is added, in which case the effect is as if the lime were added first, but I prefer to add the asphalt first, and follow it very promptly with the hydrated lime.

If it is found desirable to add some sandy fines to the mix, they may be added after the asphalt is thoroughly mixed.

As soon as all the materials are thoroughly incorporated, the batch is completed, and may be dropped into trucks, cars or hoppers, for prompt use on the roads, or for moderate time of storage in piles or in cars.

When laid on the roadway, I prefer to use larger size stone for the base course, and a separate wearing surface of smaller stone, such as would largely pass through circular openings of ½″ and largely be retained on circular openings of ¼″. These courses are both laid cold, and rolled separately.

It may be necessary to add some naptha or gasoline to the acid sludge oil as a thinner, and this will not depart from the spirit of my invention.

Claims:

1. A method of mixing a bituminous paving composition consisting of applying substantially acid free acid refinery sludge oil to pieces of graded aggregate as a solvent for bitumen, which solvent is limited in quantity to that which will just coat the surfaces of the stone so as to form a film, subsequently adding bitumen and hydrated lime with suitable agitation.

2. A method of mixing a bituminous paving composition consisting of applying substantially acid free acid refinery sludge oil to pieces of graded aggregate as a solvent for bitumen, which solvent is limited in quantity to that which will just coat the surfaces of the stone so as to form a film, subsequently adding bitumen and hydrated lime with suitable agitation, and finally sandy fines to hold a heavy coating of bitumen.

3. A method of mixing a bituminous paving composition consisting of applying substantially acid free acid refinery sludge oil to pieces of graded aggregate as a solvent for asphalt, which solvent is limited in quantity to that which will just coat the surfaces of the stone so as to form a film, subsequently adding asphalt and hydrated lime with suitable agitation.

4. A method of mixing a bituminous paving composition consisting of applying substantially acid free acid refinery sludge oil to pieces of graded aggregate as a solvent for asphalt, which solvent is limited in quantity to that which will just coat the surfaces of the stone so as to form a film, subsequently adding asphalt and hydrated lime with suitable agitation, and finally sandy fines to hold a heavy coat of bitumen.

In testimony whereof I affix my signature.

SAMUEL S. SADTLER.